Figure 1:
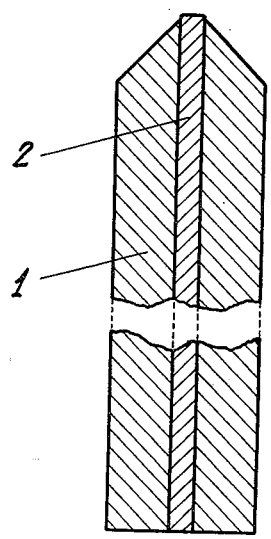

Sept. 24, 1935. R. KÖNIG ET AL 2,015,383

REPEATEDLY IGNITIBLE MATCH

Filed June 1, 1932

Inventors:
Rudolf König
& Zoltán Földi
By E. F. Wendiroth
Atty

Patented Sept. 24, 1935

2,015,383

UNITED STATES PATENT OFFICE 2,015,383

REPEATEDLY IGNITIBLE MATCH

Rudolf König and Zoltán Földi, Budapest, Hungary, assignors to Svenska Tändsticks Aktiebolaget, Jonkoping, Sweden, a limited company of Sweden Application June 1, 1932, Serial No. 614,792
In Hungary June 8, 1931

6 Claims. (Cl. 52—27)

Matches which can be ignited repeatedly are known. These consist of a combustible body in which an active substance, which can be ignited by friction on a suitable rubbing surface, for example, amorphous phosphorus, or a mixture consisting substantially of potassium-chlorate and sulphur is uniformly distributed.

In order to secure an easy ignition of such matches, a relatively considerable content of active substance is required. Such a considerable content of active substances has, however, drawbacks, because the burning of the match is not enough steady and slow or the match can be hardly extinguished by simply blowing. If, on the other side, the percentage of active substance is reduced too far, the ignition will be difficult and uncertain. In order to facilitate the ignition, it has been already proposed to apply the active substance on the outer surface of the body of the match, but such a match would have beside other drawbacks, the drawback that it would be practically impossible to extinguish it by blowing.

According to this invention these drawbacks are eliminated by incorporating the active substance with the body of the match in the shape of longitudinal or axial cores which are richer in active substance and are surrounded practically at their whole circumference by layers of the combustible body mass of the match, which are poorer in or even quite free of active substance. Thereby the total content in active substance of the match can be substantially reduced, and in spite of that a steady burning and the possibility of easy extinction is secured at the same time with an easy ignition.

These effects are reached especially in a high grade, if the body of the match consists of a substance which easily evaporates without melting, such as polymerization- or condensation-products of aldehydes, especially metaldehyde. These substances are of low burning velocity and of gasifying temperature below 260° C. The active core contains a quantity of active substances of one kind, such as amorphous phosphorus or chlorates, sufficient to ensure ignition upon the match being struck against a prepared surface, and also small quantities of other substances, such as antimony-trisulphide, sulphur or other usual additions of the match-industry, such as one or more of those mentioned in the following Examples 1-3, which are suitable to form with phosphorus or chlorates a mixture igniting by friction and in the following called a safety match composition.

In order to facilitate the ignition of the body of the match by the active substance, it is advisable to add combustible substances to the active core, preferably substances evaporating or more preferably sublimating below 260° C., such as metaldehyde.

Suitable mixtures for the core are given in the following examples:

*Examples*

| | Gs |
|---|---|
| 1. Amorphous phosphorus | 20 |
| Black antimonsulphide | 10 |
| Pulverized glass | 10 |
| Pulverized gum-arabic | 3 |
| Sodium hydrocarbonate | 0.5 |
| Potato starch | 2 |

A size is prepared from the starch and the other substances are kneaded with it to a plastic mass.

| | Gs |
|---|---|
| 2. Amorphous phosphorus | 20 |
| Black antimon-sulphide | 10 |
| Pulverized glass | 10 |
| Metaldehyde | 10 |
| Sandarak | 3 |
| Nitrocellulose | 5 |

With the nitrocellulose dissolved in acetone a plastic mass is formed from the other ingredients.

| | Gs |
|---|---|
| 3. Sodium-chlorate | 6 |
| Hexachloroethane | 0.4 |
| Pulverized glass | 2 |
| Paraformaldehyde | 1.2 |
| Metaldehyde | 0.8 |
| Sulphur | 0.15 |
| Acetyl-cellulose | 1.7 |

With the acetyl-cellulose dissolved in acetone a plastic mass is formed from the other ingredients. Each of the above examples contains ingredients giving rise to a composition broadly similar to the known safety match compositions.

From the mixture according to the above examples rods may be formed and incorporated with the body of the match consisting of metaldehyde and a solution of celluloid in acetone as binding agent or the plastic mixtures forming the core and the body of the match respectively, may be pressed simultaneously by means of a combined press.

In the drawing several examples of the match provided with active cores are shown.

Fig. 1 is a longitudinal section of the match according to the invention. The core protrudes at the top of the match, Fig. 2 is a cross-section thereof, and Figures 3-6 are cross-sections of different modifications.

Figure 2:
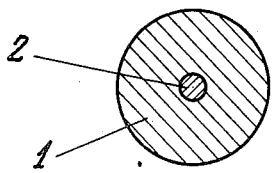

According to Figures 1 and 2, the core 2 containing the active substance, forms an axial wick in the combustible body 1, and protrudes at its top end from the body of the match.

Figure 3:
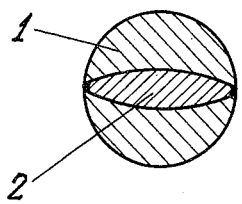

According to Fig. 3, the core 2 has a lentiform cross-sectional area which extends to the surface of the match. The other arrangements shown in the drawing in which the core is surrounded at its whole circumference by a layer of substantially uniform thickness, are much more preferable.

Figure 4:
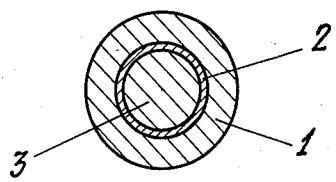
Figure 5:
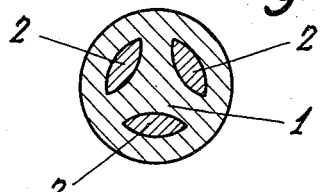
Figure 6:
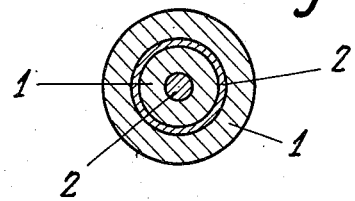

According to Fig. 4 the core 2 forms an annular zone, which is coated by a mantle consisting of the body mass 1. The inner of the annular zone 2 is filled with a combustible body mass 3, which can be the same as the exterior mantle or a different one. Instead of a single core 2 a plurality of such cores can be embedded in the body 1 as shown in Figures 5 and 6.

What we claim is:—

1. A repeatedly ignitible match capable of being readily extinguished, comprising an easily ignitible base mass, having the property of burning at a slow rate of combustion without leaving any substantial ash residue, and a separate inner longitudinal core of an igniting mass completely surrounded by said base mass, the said core containing a quantity of active substances of one kind sufficient to ensure ignition upon the match being struck against a prepared surface, and also containing small quantities of other substances forming a safety match composition together with the active substances of the said first kind.

2. A repeatedly ignitible match capable of being readily extinguished, comprising an easily ignitible base mass, having the property of burning at a slow rate of combustion without leaving any substantial ash residue, and a separate inner longitudinal core of an igniting mass completely surrounded by said base mass, the said core containing as an active substance a quantity of oxygen-developing substances sufficient to ensure ignition upon the match being struck against a phosphorus-containing surface, and also containing small quantities of other substances forming a safety match composition together with the oxygen-developing substances.

3. A repeatedly ignitible match capable of being readily extinguished, comprising an easily ignitible base mass, having the property of burning at a slow rate of combustion without leaving any substantial ash residue, and a separate inner longitudinal core of an igniting mass completely surrounded by said base mass, the said core containing as active substance a quantity of deflagrating substances sufficient to ensure ignition upon the match being struck against a surface containing oxygen-developing substances, and also containing small quantities of other substances forming a safety match composition together with the deflagrating substances.

4. A repeatedly ignitible match as claimed in claim 1, in which the core of igniting mass also contains small amounts of cooling substances gasifying at a low temperature.

5. A repeatedly ignitible match as claimed in claim 1, in which the core of igniting mass also contains cellulose acetate as binding agent.

6. A repeatedly ignitible match as claimed in claim 1, in which said ignitible mass forms a layer of substantially uniform thickness surrounding the core.

RUDOLF KÖNIG.
ZOLTÁN FÖLDI.